United States Patent
Clark et al.

(10) Patent No.: US 9,116,636 B1
(45) Date of Patent: Aug. 25, 2015

(54) SYSTEM AND METHOD FOR ADJUSTING QOS

(75) Inventors: Roy E. Clark, Hopkinton, MA (US); Randall H. Shain, Wrentham, MA (US)

(73) Assignee: EMC Corporation, Hopkinton, MA (US)

( * ) Notice: Subject to any disclaimer, the term of this patent is extended or adjusted under 35 U.S.C. 154(b) by 221 days.

(21) Appl. No.: 13/539,408

(22) Filed: Jun. 30, 2012

(51) Int. Cl.
- *G06F 12/12* (2006.01)
- *G06F 3/06* (2006.01)
- *G06F 12/08* (2006.01)
- *G06F 11/10* (2006.01)

(52) U.S. Cl.
CPC ............ *G06F 3/0689* (2013.01); *G06F 3/0683* (2013.01); *G06F 12/0802* (2013.01); *G06F 11/1076* (2013.01)

(58) Field of Classification Search
CPC . G06F 3/0689; G06F 3/0683; G06F 11/1076; G06F 12/0802

USPC .......................................................... 711/114
See application file for complete search history.

(56) References Cited

U.S. PATENT DOCUMENTS

| 2003/0137939 A1* | 7/2003 | Dunning et al. ............... 370/235 |
| 2006/0143360 A1* | 6/2006 | Petev et al. ....................... 711/6 |

* cited by examiner

*Primary Examiner* — Jae Yu
(74) *Attorney, Agent, or Firm* — Brian J. Colandreo; Mark H. Whittenberger; Holland & Knight LLP (57) ABSTRACT

A method, computer program product, and computing system for defining a plurality of LUNs within a storage array. The plurality of LUNs may be organized into a plurality of LUN groups. A first LUN group included within the plurality of LUN groups has a first QOS level and a second LUN group included within the plurality of LUN groups has a second QOS level. The first LUN group is assigned to a first server based at least in part upon the first QOS. The second LUN group is assigned to a second server based at least in part upon the second QOS.

21 Claims, 4 Drawing Sheets

SYSTEM AND METHOD FOR ADJUSTING QOS

TECHNICAL FIELD

This disclosure relates to storage arrays and, more particularly, to controlling the Quality of Service (QOS) of storage arrays.

BACKGROUND

Storing and safeguarding electronic content is of paramount importance in modern business. Accordingly, various systems may be employed to protect such electronic content.

The use of solid-state storage devices is increasing in popularity. A solid state storage device is a content storage device that uses solid-state memory to store persistent content. A solid-state storage device may emulate (and therefore replace) a conventional hard disk drive. Additionally/alternatively, a solid state storage device may be used within a cache memory system. With no moving parts, a solid-state storage device largely eliminates (or greatly reduces) seek time, latency and other electromechanical delays and failures associated with a conventional hard disk drive.

SUMMARY OF DISCLOSURE

In a first implementation, a computer-implemented method includes defining a plurality of LUNs within a storage array. The plurality of LUNs may be organized into a plurality of LUN groups. A first LUN group included within the plurality of LUN groups has a first QOS level and a second LUN group included within the plurality of LUN groups has a second QOS level. The first LUN group is assigned to a first server based at least in part upon the first QOS. The second LUN group is assigned to a second server based at least in part upon the second QOS.

One or more of the following features may be included. At least one of the first server and the second server may be a virtual machine. At least one of the first server and the second server may include a front end cache system. The first QOS level may have a first tiering level and the second QOS level may have a second tiering level. The first QOS level may have a first backend caching system level and the second QOS level may have a second backend caching system level. At least one of assigning the first LUN group and assigning the second LUN group may be performed in response to an input by a user. The input by a user may be generated via a user interface.

In another implementation, a computer program product resides on a computer readable medium that has a plurality of instructions stored on it. When executed by a processor, the instructions cause the processor to perform operations including defining a plurality of LUNs within a storage array. The plurality of LUNs may be organized into a plurality of LUN groups. A first LUN group included within the plurality of LUN groups has a first QOS level and a second LUN group included within the plurality of LUN groups has a second QOS level. The first LUN group is assigned to a first server based at least in part upon the first QOS. The second LUN group is assigned to a second server based at least in part upon the second QOS.

One or more of the following features may be included. At least one of the first server and the second server may be a virtual machine. At least one of the first server and the second server may include a front end cache system. The first QOS level may have a first tiering level and the second QOS level may have a second tiering level. The first QOS level may have a first backend caching system level and the second QOS level may have a second backend caching system level. At least one of assigning the first LUN group and assigning the second LUN group may be performed in response to an input by a user. The input by a user may be generated via a user interface.

In another implementation, a computing system includes at least one processor and at least one memory architecture coupled with the at least one processor, wherein the computing system is configured to perform operations including defining a plurality of LUNs within a storage array. The plurality of LUNs may be organized into a plurality of LUN groups. A first LUN group included within the plurality of LUN groups has a first QOS level and a second LUN group included within the plurality of LUN groups has a second QOS level. The first LUN group is assigned to a first server based at least in part upon the first QOS. The second LUN group is assigned to a second server based at least in part upon the second QOS.

One or more of the following features may be included. At least one of the first server and the second server may be a virtual machine. At least one of the first server and the second server may include a front end cache system. The first QOS level may have a first tiering level and the second QOS level may have a second tiering level. The first QOS level may have a first backend caching system level and the second QOS level may have a second backend caching system level. At least one of assigning the first LUN group and assigning the second LUN group may be performed in response to an input by a user. The input by a user may be generated via a user interface.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
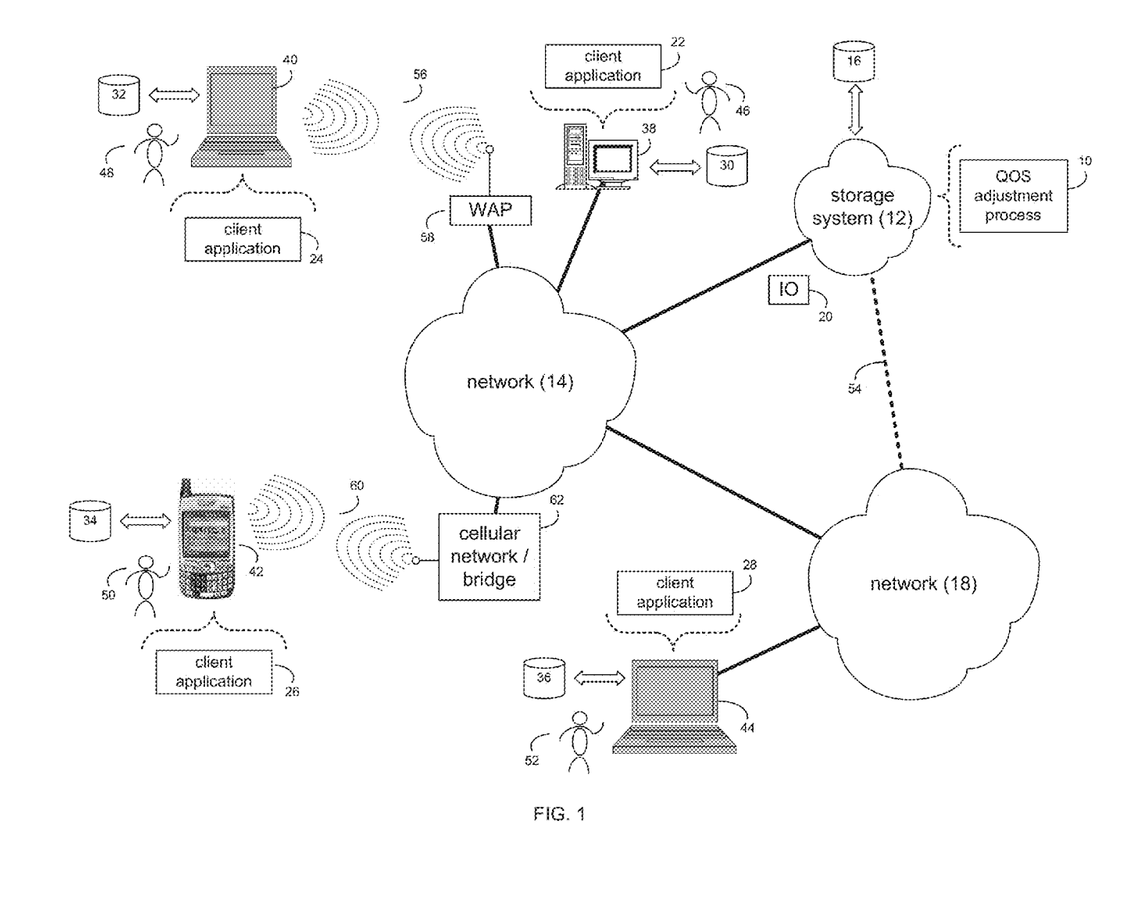
FIG. 1 is a diagrammatic view of a storage system and a QOS adjustment process coupled to a distributed computing network.

Referring to FIG. 1, there is shown QOS adjustment process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows XP Server™; Novell Netware™; Redhat Linux™, Unix, or a custom operating system, for example.

The instruction sets and subroutines of QOS adjustment process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

Client electronic devices 38, 40, 42, 44 may each execute an operating system, examples of which may include but are not limited to Microsoft Windows™, Microsoft Windows CE™, Redhat Linux™, or a custom operating system.

For the following discussion, client application 22 is going to be described for illustrative purposes. However, this is not intended to be a limitation of this disclosure, as other client applications (e.g., client applications 24, 26, 28) may be equally utilized.

For illustrative purposes, storage system 12 will be described as being a network-based storage system that includes a plurality of electro-mechanical backend storage devices. However, this is for illustrative purposes only and is not intended to be a limitation of this disclosure, as other configurations are possible and are considered to be within the scope of this disclosure. For example and as discussed above, storage system 12 may be a personal computer that includes a single electro-mechanical storage device.

Figure 2:
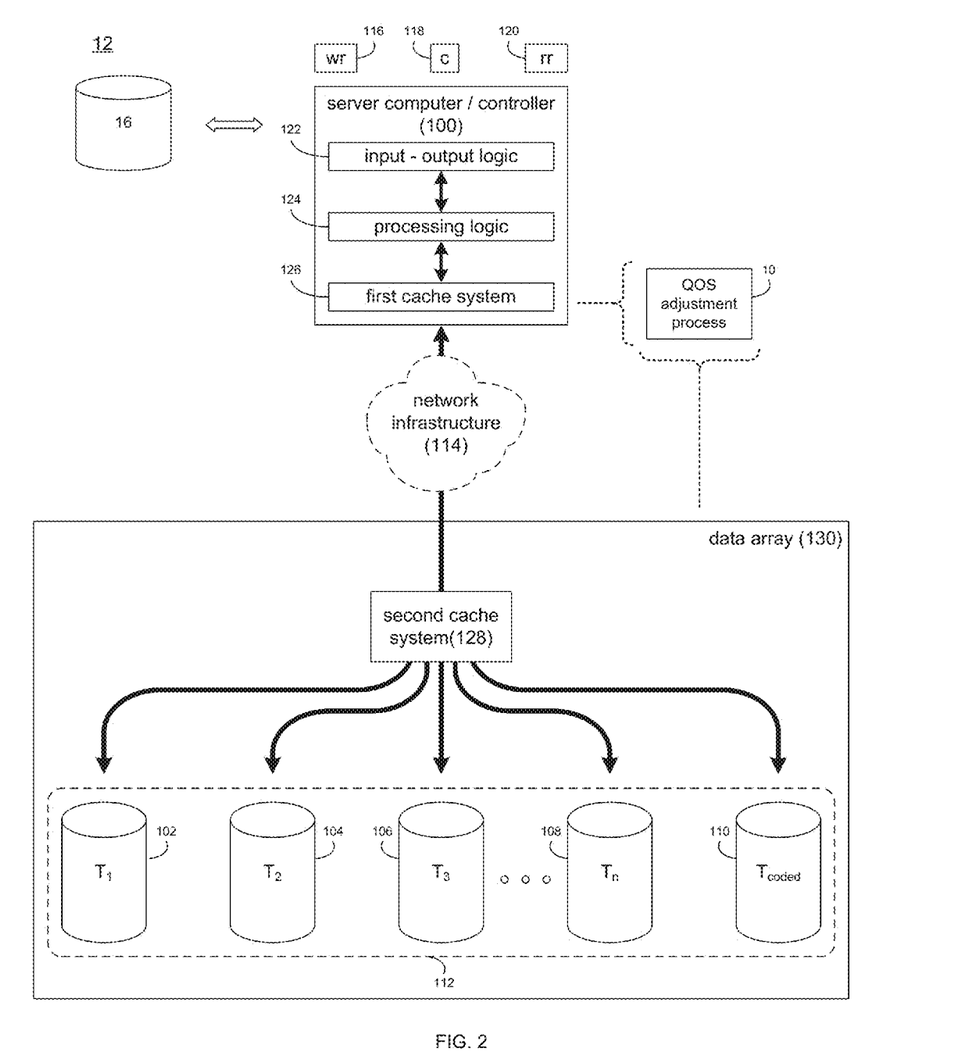
FIG. 2 is a diagrammatic view of the storage system of FIG. 1.

Referring also to FIG. 2, storage system 12 may include a server computer/controller (e.g. server computer/controller 100), and a plurality of storage targets $T_{1-n}$ (e.g. storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for illustrative purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for illustrative purposes only and is not intended to be a limitation of this disclosure. Specifically, the actual number of storage targets may be increased or decreased depending upon e.g. the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for illustrative purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives, wherein a combination of storage targets 102, 104, 106, 108 and coded target 110 may form non-volatile, electro-mechanical memory system 112.

The manner in which storage system 12 is implemented may vary depending upon e.g. the level of redundancy/performance/capacity required. For example, storage system 12 may be a RAID device in which server computer/controller 100 is a RAID controller card and storage targets 102, 104, 106, 108 and/or coded target 110 are individual "hot-swappable" hard disk drives. An example of such a RAID device may include but is not limited to an NAS device. Alternatively, storage system 12 may be configured as a SAN, in which server computer/controller 100 may be e.g., a server computer and each of storage targets 102, 104, 106, 108 and/or coded target 110 may be a RAID device and/or computer-based hard disk drive. Further still, one or more of storage targets 102, 104, 106, 108 and/or coded target 110 may be a SAN.

In the event that storage system 12 is configured as a SAN, the various components of storage system 12 (e.g. server computer/controller 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of QOS adjustment process 10. The instruction sets and subroutines of QOS adjustment process 10, which may be stored on a storage device (e.g., storage device 16) coupled to server computer/controller 100, may be executed by one or more processors (not shown) and one or more memory architectures (not shown) included within server computer/controller 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when server computer/controller 100 is configured as an application server, these IO requests may be internally generated within server computer/controller 100. Examples of IO request 20 may include but are not limited to data write request 116 (i.e. a request that content 118 be written to storage system 12) and data read request 120 (i.e. a request that content 118 be read from storage system 12).

Server computer/controller 100 may include input-output logic 122 (e.g., a network interface card or a Host Bus Adaptor (HBA)), processing logic 124, and first cache system 126. Examples of first cache system 126 may include but are not limited to a volatile, solid-state, cache memory system (e.g., a dynamic RAM cache memory system) and/or a non-volatile, solid-state, cache memory system (e.g., a flash-based, cache memory system).

During operation of server computer/controller 100, content 118 to be written to storage system 12 may be received by input-output logic 122 (e.g. from network 14 and/or network 18) and processed by processing logic 124. Additionally/alternatively and when server computer/controller 100 is configured as an application server, content 118 to be written to storage system 12 may be internally generated by server computer/controller 100. As will be discussed below in greater detail, processing logic 124 may initially store content 118 within first cache system 126.

Depending on the manner in which first cache system 126 is configured, processing logic 124 may immediately write content 118 to second cache system 128/non-volatile, electro-mechanical memory system 112 (if first cache system 126 is configured as a write-through cache) or may subsequently write content 118 to second cache system 128/non-volatile, electro-mechanical memory system 112 (if first cache system 126 is configured as a write-back cache). Additionally and in certain configurations, processing logic 124 may calculate and store coded data on coded target 110 (included within non-volatile, electromechanical memory system 112) that may allow for the regeneration of data lost/corrupted on one or more of storage targets 102, 104, 106, 108. For example, if processing logic 124 was included within a RAID controller card or a NAS/SAN controller, processing logic 124 may calculate and store coded data on coded target 110. However, if processing logic 124 was included within e.g., an applications server, data array 130 may calculate and store coded data on coded target 110.

Examples of second cache system 128 may include but are not limited to a volatile, solid-state, cache memory system (e.g., a dynamic RAM cache memory system) and/or a non-volatile, solid-state, cache memory system (e.g., a flash-based, cache memory system).

The combination of second cache system 128 and non-volatile, electromechanical memory system 112 may form data array 130, wherein first cache system 126 may be sized so that the number of times that data array 130 is accessed may be reduced. Accordingly, by sizing first cache system 126 so that first cache system 126 retains a quantity of data sufficient to satisfy a significant quantity of IO requests (e.g., IO request 20), the overall performance of storage system 12 may be enhanced. As will be described below in greater detail, first cache system 126 may be a content-aware cache system.

Further, second cache system 128 within data array 130 may be sized so that the number of times that non-volatile, electromechanical memory system 112 is accessed may be reduced. Accordingly, by sizing second cache system 128 so that second cache system 128 retains a quantity of data sufficient to satisfy a significant quantity of IO requests (e.g., IO request 20), the overall performance of storage system 12 may be enhanced. As will be described below in greater detail, second cache system 128 may be a content-aware cache system.

As discussed above, the instruction sets and subroutines of QOS adjustment process 10, which may be stored on storage device 16 included within storage system 12, may be executed by one or more processors (not shown) and one or more memory architectures (not shown) included within storage system 12. Accordingly, in addition to being executed on server computer/controller 100, some or all of the instruction sets and subroutines of QOS adjustment process 10 may be executed by one or more processors (not shown) and one or more memory architectures (not shown) included within data array 130.

Figure 3:
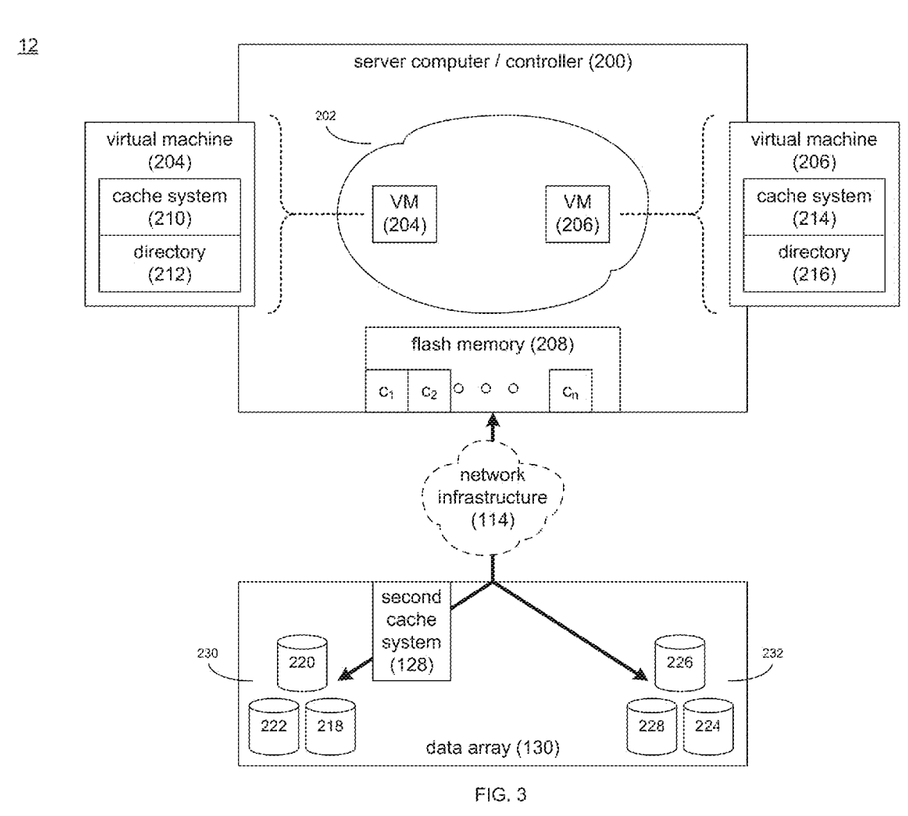
FIG. 3 is a diagrammatic view of an embodiment of the storage system of FIG. 1.

QOS Adjustment Process:

Referring also to FIG. 3, assume for the following example that server computer/controller 200 is a physical device that is executing virtual machine operating environment 202. An example of such a virtual machine operating environment is a hypervisor, which is an instantiation of an operating system that allows for multiple virtual machines to operate within a single physical device (e.g., server computer/controller 200).

For this example, further assume that hypervisor 202 within server computer/controller 200 is executing a first virtual machine (e.g., first virtual machine 204). Additionally assume that hypervisor 202 within server computer/controller 200 is executing a second virtual machine (e.g., second virtual machine 206). While hypervisor 202 is shown to be executing only two virtual machines, this is for illustrative purposes only and is not intended to be a limitation of this disclosure, as the number of virtual machines executed within hypervisor 202 may increase/decrease depending upon need/loading.

Assume further that server computer/controller 200 includes a non-volatile memory system (e.g., flash memory devices 208) that server computer/controller 200 may use for cache storage. Flash memory devices 208 may be compartmentalized (e.g., into "n" portions), wherein a unique portion of flash memory device 208 may be assigned to each virtual machine running on hypervisor 202. For example, a first portion of flash memory 208 may be assigned to first virtual machine 204 and a second portion of flash memory 208 may be assigned to second virtual machine 206.

First virtual machine 204 may be associated with first cache system 210, which may include content directory 212. Accordingly, first virtual machine 204 may use first cache system 210 for temporary storage, which may be implemented using a portion of flash memory device 208. Content directory 212 may be configured to identify the location of specific pieces of content included within (in this example) flash memory device 208 and their corresponding pieces of data within data array 130.

Second virtual machine 206 may be associated with second cache system 214, which may include content directory 216. Accordingly, second virtual machine 206 may use second cache system 214 for temporary storage, which may be implemented using a portion of flash memory device 208. Content directory 216 may be configured to identify the location of specific pieces of content included within (in this example) flash memory device 208 and their corresponding pieces of data within data array 130.

The various storage targets (e.g. storage targets 102, 104, 106, 108, FIG. 2) included within data array 130 may be divided into a plurality of LUNs (i.e., Logical Unit Numbers). As is known in the art, a LUN is a logical storage device that may be "constructed" from various physical portions of a target storage device (e.g. storage targets 102, 104, 106, 108).

Figure 4:
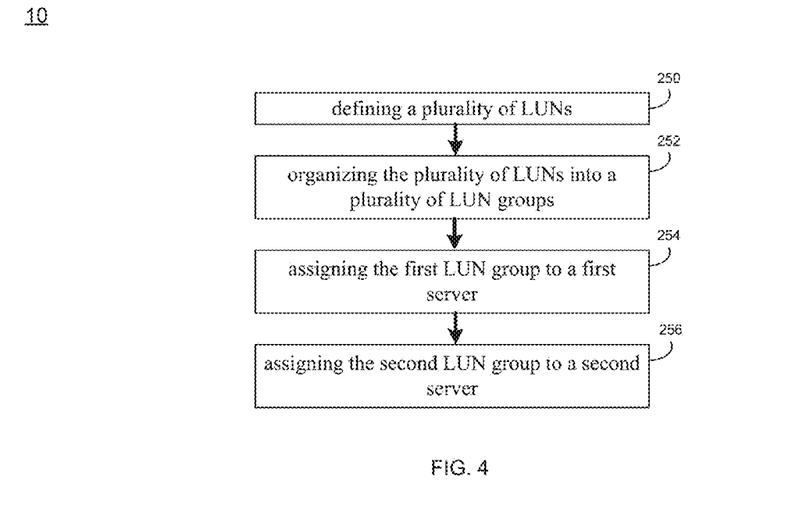
FIG. 4 is a flow chart of the QOS adjustment process of FIG. 11.

Referring also to FIG. 4, QOS adjustment process 10 may define 250 a plurality of LUNs (e.g., LUNs 218, 220, 222, 224, 226, 228) within data array 130. QOS adjustment process 10 may organize 252 the plurality of LUNs into a plurality of LUN groups, wherein a first LUN group included within the plurality of LUN groups has a first QOS (i.e., Quality of Service) level and a second LUN group included within the plurality of LUN groups has a second QOS level. For example, LUNs 218, 220, 222 may form LUN group 230 and LUNs 224, 226, 228 may form LUN group 232.

QOS adjustment process 10 may assign 254 first LUN group 230 to a first server based at least in part upon the first QOS. Additionally, QOS adjustment process 10 may assign 256 second LUN group 232 to a second server based at least in part upon the second QOS. Concerning the first server and the second server referenced above and assigned 254, 256 to first LUN group 230 and second LUN group 232 (respectively), these servers may be physical or virtual servers. For example, the first and second server referenced above may correspond to first virtual machine 204 and second virtual machine 206 (respectively). Alternatively, the first and second server referenced above may correspond to a first and a second physical server, such as server controller/computer 100 (see FIG. 2) and server controller/computer 200 (see FIG. 3).

When QOS adjustment process 10 assigns 254, 256 the above-discussed LUN groups (e.g., LUN groups 230, 232) to the above-discussed servers (i.e., virtual servers or physical servers), this assignment process may be accomplished in various ways (e.g., algorithmically or manually). If the assignment process is accomplished algorithmically, QOS adjustment process 10 may examine various factors for both the LUN group and the server to effectuate the appropriate assignments.

For example, the various LUN groups (e.g., LUN groups 230, 232) may have varying levels of performance tiering and, therefore, each LUN group may provide a different QOS level. As is known in the art, a data array (e.g., data array 130) and the various storage devices within the data array may include various data tiers. Data tiers may be configured to provide various levels of performance, wherein one data tier may be configured to be a lower performance data tier and another data tier may be configured to be a higher performance data tier.

For example, a data tier may be configured as a higher performance data tier and may include one or more flash storage devices. Another data tier may be configured as a medium performance data tier and may include one or more fiber channel storage devices. And another data tier may be configured as a lower performance data tier and may include one or more lower performance storage devices (e.g., SATA drives, SCSI drives, SAS drives, IDE drives, and EIDE drives).

Accordingly, the various LUN groups (e.g., LUN groups 230, 232) may be configured differently, wherein LUN group 230 may be e.g., a medium performance tier and the associated storage devices may include fiber channel storage devices. Additionally, LUN group 232 may be e.g., a higher performance tier and the associated storage devices may include flash storage devices.

Further, the various LUN groups (e.g., LUN groups 230, 232) may have varying levels of backend cache and, therefore, each LUN group may provide a different QOS level. For example, LUN group 230 is shown to be coupled to second cache system 128, while LUN group 232 is shown to not be coupled to any backend cache.

Accordingly, as LUN group 230 is configured as a medium performance tier, the performance of LUN group 230 may be enhanced by second cache system 128. Further, while LUN group 232 is not coupled to any backend cache system, LUN group 232 is configured as a higher performance tier.

As discussed above, if the assignment process is accomplished algorithmically, QOS adjustment process 10 may examine various factors for both the LUN group and the server to effectuate the appropriate assignments. Accordingly, the use of frontend cache (e.g., cache system 210 and/or cache system 214) for a particular server may lessen the need for the assigned LUN group to be coupled to backend cache. Further, when a LUN group is configured as a higher performance tier, the need for caching (frontend or backend) may be reduced.

Figure 5:
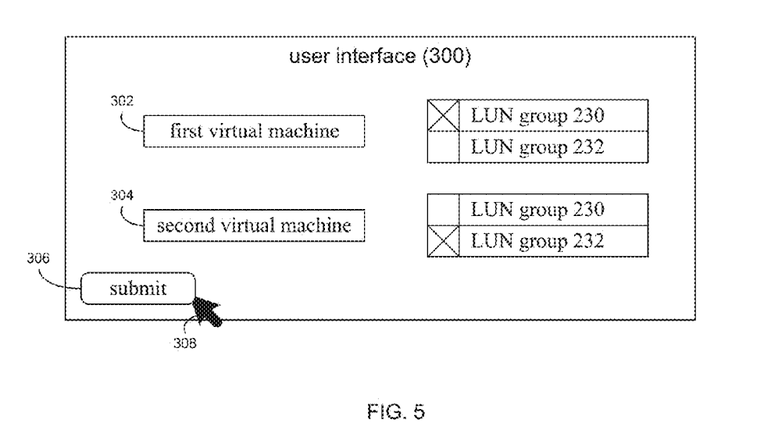
FIG. 5 is a diagrammatic view of a user interface rendered by the QOS adjustment process of FIG. 1.

As discussed above, the assignment process may be accomplished manually. Referring also to FIG. 5, when configured in such a fashion, QOS adjustment process 10 may render assignment window 300 that may allow a user (e.g., user 46) to select the manner in which LUN groups are assigned to servers. For example, a first field and a second field 302, 304 may define the available servers (i.e., first virtual machine 204 and second virtual machine 206, respectively) and may allow the user to select the LUN group to be assigned to each server. Once the appropriate selections are made, user 46 may select submit button 306 using onscreen pointer 308, thus effectuating the assignment 254, 256 of LUN groups 230, 232 (respectively).

Through QOS adjustment process 10, a more efficient pairing of front end and backend components may be achieved. As discussed above, QOS adjustment process 10 may define 250 a plurality of LUNs within data array 130, and QOS adjustment process 10 may organize 252 these LUNs into a plurality of LUN groups. The organization 252 of these LUN groups may be based upon the anticipated type of server (e.g., physical or virtual) that will be attaching to a particular LUN group.

For example, a LUN group may be defined through QOS adjustment process 10 that has robust backend caching and/or higher performance tiering specifically for the purpose of attaching to servers that have limited (if any) front end caching. Conversely, a LUN group may be defined through QOS adjustment process 10 that has limited (if any) backend caching and/or lower performance tiering specifically for the purpose of attaching servers that have substantial front end caching. Accordingly, by allowing for the intelligent and efficient pairing of LUN groups and servers, the appropriate QOS will be made available to the applications running on the servers and accessing the data arrays.

Additionally, QOS adjustment process 10 may be configured to allow for a user (e.g., user 46) to identify e.g., the various guidelines for selecting servers to attach to a particular LUN group. For example and through QOS adjustment process 10, user 46 may define that a particular LUN group was made for attaching to servers (virtual or physical) that have limited front end caching capabilities and/or limited data prefetching capabilities. Through QOS adjustment process 10, user 46 may define that another LUN group was made for attaching to servers (virtual or physical) that have enhanced front end caching capabilities and/or enhanced data prefetching capabilities. Accordingly, if in the future, an administrator/user is trying to select which LUN group to attach their server to, the administrator/user may read the LUN group definitions to aid in making such a decision.

Through QOS adjustment process 10, a more efficient pairing of front end and backend components may be achieved. As discussed above, QOS adjustment process 10 may define 250 a plurality of LUNs within data array 130, and QOS adjustment process 10 may organize 252 these LUNs into a plurality of LUN groups. The organization 252 of these LUN groups may be based upon the anticipated type of server (e.g., physical or virtual) that will be attaching to a particular LUN group.

For example, a LUN group may be defined through QOS adjustment process 10 that has robust backend caching and/or higher performance tiering specifically for the purpose of attaching to servers that have limited (if any) front end caching. Conversely, a LUN group may be defined through QOS adjustment process 10 that has limited (if any) backend caching and/or lower performance tiering specifically for the purpose of attaching servers that have substantial front end caching. Accordingly, by allowing for the intelligent and efficient pairing of LUN groups and servers, the appropriate QOS will be made available to the applications running on the servers and accessing the data arrays.

Additionally, QOS adjustment process 10 may be configured to allow for a user (e.g., user 46) to identify e.g., the various guidelines for selecting servers to attach to a particular LUN group. For example and through QOS adjustment process 10, user 46 may define that a particular LUN group was made for attaching to servers (virtual or physical) that have limited front end caching capabilities and/or limited data prefetching capabilities. Through QOS adjustment process 10, user 46 may define that another LUN group was made for attaching to servers (virtual or physical) that have enhanced front end caching capabilities and/or enhanced data prefetching capabilities. Accordingly, if in the future, an administrator/user is trying to select which LUN group to attach their server to, the administrator/user may read the LUN group definitions to aid in making such a decision.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
    defining a plurality of LUNs (logical unit numbers) within a storage array, wherein the storage array includes a cache system separate from the plurality of LUNs;
    organizing the plurality of LUNs into a plurality of LUN groups based at least in part upon an anticipated type of server that each LUN will be assigned to including at least one of: at least one virtual machine and at least one physical machine, wherein a first LUN group included within the plurality of LUN groups has a first QOS (quality of service) level and a second LUN group included within the plurality of LUN groups has a second QOS level;
    assigning the first LUN group to a first server based at least in part upon the first QOS; and
    assigning the second LUN group to a second server based at least in part upon the second QOS;
    wherein the first server includes a first level of front end caching capabilities and data prefetching capabilities and the second server includes a second level of front end caching capabilities and data prefetching capabilities.

2. The computer-implemented method of claim 1 wherein at least one of the first server and the second server is a virtual machine.

3. The computer-implemented method of claim 1 wherein at least one of the first server and the second server includes a front end cache system.

4. The computer-implemented method of claim 1 wherein the first QOS level has a first tiering level and the second QOS level has a second tiering level.

5. The computer-implemented method of claim 1 wherein the first QOS level has a first backend caching system level and the second QOS level has a second backend caching system level.

6. The computer-implemented method of claim 1 wherein at least one of assigning the first LUN group and assigning the second LUN group is performed in response to an input by a user.

7. The computer-implemented method of claim 6 wherein the input by a user is generated via a user interface.

8. A computer program product residing on a non-transitory computer readable medium having a plurality of instructions stored thereon which, when executed by a processor, cause the processor to perform operations comprising:
    defining a plurality of LUNs (logical unit numbers) within a storage array, wherein the storage array includes a cache system separate from the plurality of LUNs;
    organizing the plurality of LUNs into a plurality of LUN groups based at least in part upon an anticipated type of server that each LUN will be assigned to including at least one of: at least one virtual machine and at least one physical machine, wherein a first LUN group included within the plurality of LUN groups has a first QOS (quality of service) level and a second LUN group included within the plurality of LUN groups has a second QOS level;

assigning the first LUN group to a first server based at least in part upon the first QOS; and assigning the second LUN group to a second server based at least in part upon the second QOS;

wherein the first server includes a first level of front end caching capabilities and data prefetching capabilities and the second server includes a second level of front end caching capabilities and data prefetching capabilities.

9. The computer program product of claim 8 wherein at least one of the first server and the second server is a virtual machine.

10. The computer program product of claim 8 wherein at least one of the first server and the second server includes a front end cache system.

11. The computer program product of claim 8 wherein the first QOS level has a first tiering level and the second QOS level has a second tiering level.

12. The computer program product of claim 8 wherein the first QOS level has a first backend caching system level and the second QOS level has a second backend caching system level.

13. The computer program product of claim 8 wherein at least one of assigning the first LUN group and assigning the second LUN group is performed in response to an input by a user.

14. The computer program product of claim 13 wherein the input by a user is generated via a user interface.

15. A computing system including at least one processor and at least one memory architecture coupled with the at least one processor, wherein the computing system is configured to perform operations comprising:

defining a plurality of LUNs (logical unit numbers) within a storage array, wherein the storage array includes a cache system separate from the plurality of LUNs;

organizing the plurality of LUNs into a plurality of LUN groups based at least in part upon an anticipated type of server that each LUN will be assigned to including at least one of: at least one virtual machine and at least one physical machine, wherein a first LUN group included within the plurality of LUN groups has a first QOS (quality of service) level and a second LUN group included within the plurality of LUN groups has a second QOS level;

assigning the first LUN group to a first server based at least in part upon the first QOS; and assigning the second LUN group to a second server based at least in part upon the second QOS;

wherein the first server includes a first level of front end caching capabilities and data prefetching capabilities and the second server includes a second level of front end caching capabilities and data prefetching capabilities.

16. The computing system of claim 14 wherein at least one of the first server and the second server is a virtual machine.

17. The computing system of claim 14 wherein at least one of the first server and the second server includes a front end cache system.

18. The computing system of claim 15 wherein the first QOS level has a first tiering level and the second QOS level has a second tiering level.

19. The computing system of claim 15 wherein the first QOS level has a first backend caching system level and the second QOS level has a second backend caching system level.

20. The computing system of claim 15 wherein at least one of assigning the first LUN group and assigning the second LUN group is performed in response to an input by a user.

21. The computing system of claim 20 wherein the input by a user is generated via a user interface.

* * * * *